(12) United States Patent
Spichek et al.

(10) Patent No.: US 11,423,403 B2
(45) Date of Patent: Aug. 23, 2022

(54) SYSTEMS, METHODS, AND COMPUTER PROGRAM PRODUCTS FOR AUTHORIZING A TRANSACTION

(71) Applicant: Visa International Service Association, San Francisco, CA (US)

(72) Inventors: Vlad Spichek, Redwood City, CA (US); Ajit Gaddam, Foster City, CA (US); Heng Tang, San Mateo, CA (US); Pushkar Joglekar, Emeryville, CA (US)

(73) Assignee: Visa International Service Association, San Francisco, CA (US)

( * ) Notice: Subject to any disclaimer, the term of this patent is extended or adjusted under 35 U.S.C. 154(b) by 230 days.

(21) Appl. No.: 16/554,919

(22) Filed: Aug. 29, 2019

(65) Prior Publication Data
US 2021/0065194 A1    Mar. 4, 2021

(51) Int. Cl.
*G06Q 20/40*    (2012.01)
*G06N 20/00*    (2019.01)
*G06Q 20/02*    (2012.01)

(52) U.S. Cl.
CPC ....... *G06Q 20/40145* (2013.01); *G06N 20/00* (2019.01); *G06Q 20/02* (2013.01); *G06Q 20/405* (2013.01)

(58) Field of Classification Search
CPC ......... G06Q 20/40145; G06Q 20/4014; G06Q 20/401; G06Q 20/40; G06Q 20/38; G06Q 20/00; G06Q 20/02; G06Q 20/405; G06N 20/00
See application file for complete search history.

(56) References Cited

U.S. PATENT DOCUMENTS

| | | | | |
|---|---|---|---|---|
| 2001/0048025 A1* | 12/2001 | Shinn | ...................... | G06K 9/00 235/382 |
| 2012/0239567 A1* | 9/2012 | Choi | .................. | G06Q 20/3829 705/41 |
| 2014/0114857 A1* | 4/2014 | Griggs | .................. | G06Q 40/00 705/44 |
| 2018/0005230 A1* | 1/2018 | Zovi | .................. | G06Q 20/0457 |
| 2019/0114404 A1* | 4/2019 | Nowak | ................. | H04L 67/306 |

* cited by examiner

*Primary Examiner* — Scott S Trotter
*Assistant Examiner* — Divesh Patel
(74) *Attorney, Agent, or Firm* — The Webb Law Firm

(57) ABSTRACT

Disclosed are methods for authorizing a transaction, including receiving a policy message, the policy message including a policy ruleset for determining whether a transaction is authorized and biometric parameters for a machine learning algorithm for authenticating an identity of a user involved in a transaction, receiving biometric measurement data associated with a biometric measurement of a user involved in the transaction, calculating an authentication score based on the biometric measurement data using the machine learning algorithm, wherein the authentication score includes an indication of whether an identity of the user is authenticated based on the biometric measurement data, determining whether the transaction satisfies the policy ruleset for determining authorization of the transaction, and transmitting a decision message, wherein the decision message includes an indication of whether the transaction satisfies the policy ruleset. Systems and computer program products are also disclosed.

6 Claims, 5 Drawing Sheets

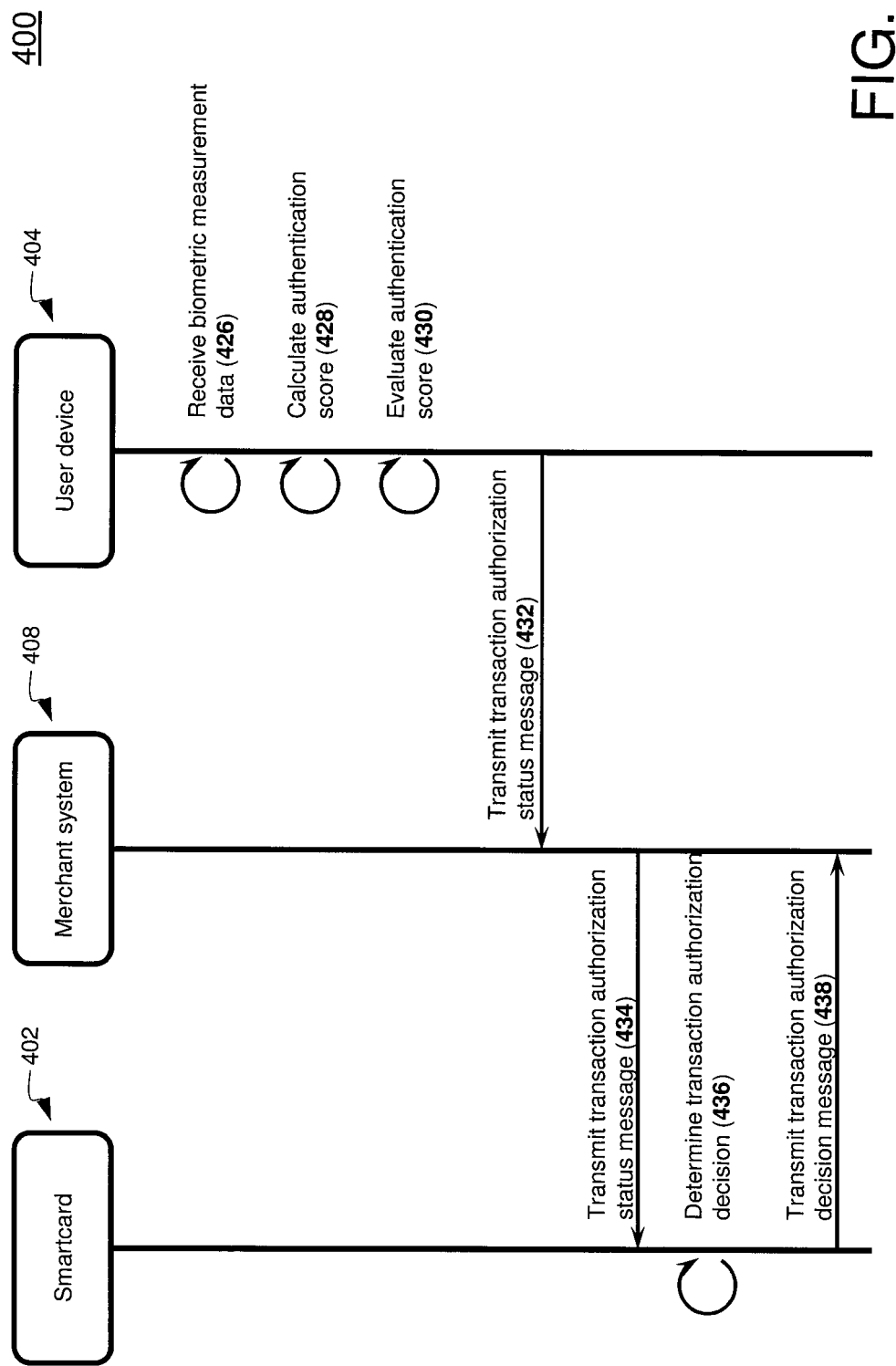

SYSTEMS, METHODS, AND COMPUTER PROGRAM PRODUCTS FOR AUTHORIZING A TRANSACTION

BACKGROUND

1. Technical Field

The present disclosure relates generally to authorizing a transaction involving a smartcard and, in some non-limiting embodiments or aspects, to systems, methods, and computer program products for authorizing a transaction involving a smartcard based on a biometric measurement of an individual.

2. Technical Considerations

A smartcard (e.g., a chip card, an integrated circuit card, and/or the like) may refer to a physical electronic authorization device, which may be used to control access to a resource. In some examples, a smartcard may include a plastic credit card sized card with an embedded integrated circuit (IC). A smartcard may also include a pattern of metal contacts to electrically connect to the embedded IC. In other examples, a smartcard may be contactless, such that the smartcard may communicate information wirelessly, without making physical contact with a device that is intended to read a card. Smartcards can provide personal identification, authentication, data storage, and application processing. Applications include identification, financial, mobile phones (SIM), public transit, computer security, schools, and healthcare. Smartcards may provide strong security authentication for single sign-on (SSO) within organizations. Several nations have deployed smartcards throughout their populations.

Biometric authentication may refer to a security process that relies on unique biological characteristics of an individual to verify an identity of the individual. A biometric authentication system may capture biometric data from an individual and compare the biometric data to stored, confirmed, authentic data in a database. If the biometric data and the authentic data match, the biometric authentication system may authentic an identity of the individual. Biometric authentication may be involved in providing access to resources such as buildings, rooms, and/or computing devices based on an individual's identity.

Currently, there is a need in the art for systems, methods, and computer-program products that are capable of combining the use of deployed smartcards with biometric authentication of an individual when the smartcard is used.

SUMMARY

According to some non-limiting embodiments or aspects, provided is a computer-implemented method for authorizing a transaction. The computer-implemented method may include: receiving, with at least one processor, a policy message, the policy message comprising a policy ruleset for determining whether a transaction is authorized and biometric parameters for a machine learning algorithm for authenticating an identity of a user involved in a transaction; receiving, with at least one processor, biometric measurement data associated with a biometric measurement of a user involved in the transaction; calculate, with at least one processor, an authentication score based on the biometric measurement data using the machine learning algorithm, wherein the authentication score comprises an indication of whether an identity of the user is authenticated based on the biometric measurement data; determining, with at least one processor, whether the transaction satisfies the policy ruleset for determining authorization of the transaction; and transmitting, with at least one processor, a decision message, wherein the decision message comprises an indication of whether the transaction satisfies the policy ruleset.

According to some non-limiting embodiments or aspects, provided is a system for authorizing a transaction. The system may include: at least one processor programmed or configured to: receive a policy message, the policy message comprising a policy ruleset for determining whether a transaction is authorized and biometric parameters for a machine learning algorithm for authenticating an identity of a user involved in a transaction; receive biometric measurement data associated with a biometric measurement of a user involved in the transaction; calculate an authentication score based on the biometric measurement data using the machine learning algorithm, wherein the authentication score comprises an indication of whether an identity of the user is authenticated based on the biometric measurement data; determine whether the transaction satisfies the policy ruleset for determining authorization of the transaction; and transmit a decision message, wherein the decision message comprises an indication of whether the transaction satisfies the policy ruleset According to a non-limiting embodiment or aspect, provided is a computer program product for authorizing a transaction. The computer program product may include: one or more instructions that, when executed by at least one processor, cause the at least one processor to: receive a policy message, the policy message comprising a policy ruleset for determining whether a transaction is authorized and biometric parameters for a machine learning algorithm for authenticating an identity of a user involved in a transaction; receive biometric measurement data associated with a biometric measurement of a user involved in the transaction; calculate an authentication score based on the biometric measurement data using the machine learning algorithm, wherein the authentication score comprises an indication of whether an identity of the user is authenticated based on the biometric measurement data; determine whether the transaction satisfies the policy ruleset for determining authorization of the transaction; and transmit a decision message, wherein the decision message comprises an indication of whether the transaction satisfies the policy ruleset.

Further non-limiting embodiments or aspects are set forth in the following numbered clauses:

Clause 1: A computer-implemented method for authorizing a transaction, comprising: receiving, with at least one processor, a policy message, the policy message comprising a policy ruleset for determining whether a transaction is authorized and biometric parameters for a machine learning algorithm for authenticating an identity of a user involved in a transaction; receiving, with at least one processor, biometric measurement data associated with a biometric measurement of a user involved in the transaction; calculate, with at least one processor, an authentication score based on the biometric measurement data using the machine learning algorithm, wherein the authentication score comprises an indication of whether an identity of the user is authenticated based on the biometric measurement data; determining, with at least one processor, whether the transaction satisfies the policy ruleset for determining authorization of the transaction; and transmitting, with at least one processor, a decision message, wherein the decision message comprises an indication of whether the transaction satisfies the policy ruleset.

Clause 2: The computer-implemented method of clause 1, further comprising: receiving, with at least one processor, an attestation request message associated with the transaction, wherein the attestation request message comprises a request for determining whether a trusted execution environment that is used for determining whether the transaction satisfies the policy ruleset is secure; and transmitting, with at least one processor, an attestation response message based on receiving the attestation request message, wherein the attestation response message comprises an indication of whether the trusted execution environment that is used for determining whether the transaction satisfies the policy ruleset is secure.

Clause 3: The computer-implemented method of clauses 1 or 2, further comprising: transmitting, with at least one processor, the attestation request message associated with the transaction to a user device associated with the user involved in the transaction; and receiving, with at least one processor, the attestation response message based from the user device associated with the user based on transmitting the attestation request message associated with the transaction to the user device associated with the user.

Clause 4: The computer-implemented method of any of clauses 1-3, further comprising: receiving, with at least one processor, a trusted execution environment certificate from a user device associated with the user involved in the transaction; generating, with at least one processor, a transaction authorization message based on receiving the trusted execution environment certificate from the user device associated with the user, the transaction authorization message comprising data associated with the trusted execution environment certificate and a plurality of transaction parameters associated with the transaction; and receiving, with at least one processor, an attestation request message associated with the transaction, the attestation request message comprising a request for determining whether a trusted execution environment that is used for determining whether the transaction satisfies the policy ruleset is secure, and wherein the attestation request message comprises the plurality of transaction parameters associated with the transaction.

Clause 5: The computer-implemented method of any of clauses 1-4, wherein receiving, with at least one processor, the policy message comprises: receiving, with at least one processor, the policy message from a smartcard associated with the user involved in the transaction; and wherein receiving, with at least one processor, the biometric measurement data associated with the biometric measurement of the user involved in the transaction comprises: receiving, with at least one processor, the biometric measurement data associated with the biometric measurement of the user involved in the transaction from a user device associated with the user.

Clause 6: The computer-implemented method of any of clauses 1-5, further comprising: receiving, with at least one processor, a transaction authorization status message; and transmitting, with at least one processor, the transaction authorization status message to a smartcard associated with the user involved in the transaction.

Clause 7: The computer-implemented method of any of clauses 1-6, further comprising: receiving, with at least one processor, a transaction authorization decision message from the smartcard associated with the user based on transmitting the transaction authorization status message to the smartcard.

Clause 8: The computer-implemented method of any of clauses 1-7, further comprising: determining, with at least one processor, whether the user is authenticated based on the authentication score.

Clause 9: A system for authorizing a transaction, comprising: at least one processor programmed or configured to: receive a policy message, the policy message comprising a policy ruleset for determining whether a transaction is authorized and biometric parameters for a machine learning algorithm for authenticating an identity of a user involved in a transaction; receive biometric measurement data associated with a biometric measurement of a user involved in the transaction; calculate an authentication score based on the biometric measurement data using the machine learning algorithm, wherein the authentication score comprises an indication of whether an identity of the user is authenticated based on the biometric measurement data; determine whether the transaction satisfies the policy ruleset for determining authorization of the transaction; and transmit a decision message, wherein the decision message comprises an indication of whether the transaction satisfies the policy ruleset.

Clause 10: The system of clause 9, wherein the at least one processor is further programmed or configured to: receive an attestation request message associated with the transaction, wherein the attestation request message comprises a request for determining whether a trusted execution environment that is used for determining whether the transaction satisfies the policy ruleset is secure; and transmit an attestation response message based on receiving the attestation request message, wherein the attestation response message comprises an indication of whether the trusted execution environment that is used for determining whether the transaction satisfies the policy ruleset is secure.

Clause 11: The system of clauses 9 or 10, wherein the at least one processor is programmed or configured to: transmit the attestation request message associated with the transaction to a user device associated with the user involved in the transaction; and receive the attestation response message based from the user device associated with the user based on transmitting the attestation request message associated with the transaction to the user device associated with the user.

Clause 12: The system of any of clauses 9-11, wherein the at least one processor is programmed or configured to: receive a trusted execution environment certificate from a user device associated with the user involved in the transaction; generate a transaction authorization message based on receiving the trusted execution environment certificate from the user device associated with the user, the transaction authorization message comprising data associated with the trusted execution environment certificate and a plurality of transaction parameters associated with the transaction; and receive an attestation request message associated with the transaction, the attestation request message comprising a request for determining whether a trusted execution environment that is used for determining whether the transaction satisfies the policy ruleset is secure, and wherein the attestation request message comprises the plurality of transaction parameters associated with the transaction.

Clause 13: The system of any of clauses 9-12, wherein, when receiving the policy message, the at least one processor is programmed or configured to: receive the policy message from a smartcard associated with the user involved in the transaction; and wherein receiving the biometric measurement data associated with the biometric measurement of the user involved in the transaction comprises: receiving the biometric measurement data associated with the biometric measurement of the user involved in the transaction from a user device associated with the user.

Clause 14: The system of any of clauses 9-13, wherein the at least one processor is programmed or configured to: receive a transaction authorization status message; and transmit the transaction authorization status message to a smartcard associated with the user involved in the transaction.

Clause 15: The system of any of clauses 9-14, wherein the at least one processor is programmed or configured to: receive a transaction authorization decision message from the smartcard associated with the user based on transmitting the transaction authorization status message to the smartcard.

Clause 16: The system of any of clauses 9-15, wherein the at least one processor is programmed or configured to: determine whether the user is authenticated based on the authentication score.

Clause 17: A computer program product for authorizing a transaction, the computer program product comprising one or more instructions that, when executed by at least one processor, cause the at least one processor to: receive a policy message, the policy message comprising a policy ruleset for determining whether a transaction is authorized and biometric parameters for a machine learning algorithm for authenticating an identity of a user involved in a transaction; receive biometric measurement data associated with a biometric measurement of a user involved in the transaction; calculate an authentication score based on the biometric measurement data using the machine learning algorithm, wherein the authentication score comprises an indication of whether an identity of the user is authenticated based on the biometric measurement data; determine whether the transaction satisfies the policy ruleset for determining authorization of the transaction; and transmit a decision message, wherein the decision message comprises an indication of whether the transaction satisfies the policy ruleset.

Clause 18: The computer program product of clause 17, wherein the one or more instructions further cause the at least one processor to: receive an attestation request message associated with the transaction, wherein the attestation request message comprises a request for determining whether a trusted execution environment that is used for determining whether the transaction satisfies the policy ruleset is secure; and transmit an attestation response message based on receiving the attestation request message, wherein the attestation response message comprises an indication of whether the trusted execution environment that is used for determining whether the transaction satisfies the policy ruleset is secure.

Clause 19: The computer program product of clauses 17 or 18, wherein the one or more instructions further cause the at least one processor to: transmit the attestation request message associated with the transaction to a user device associated with the user involved in the transaction; and receive the attestation response message based from the user device associated with the user based on transmitting the attestation request message associated with the transaction to the user device associated with the user.

Clause 20: The computer program product of any of clauses 17-19, wherein the one or more instructions further cause the at least one processor to: receive a trusted execution environment certificate from a user device associated with the user involved in the transaction; generate a transaction authorization message based on receiving the trusted execution environment certificate from the user device associated with the user, the transaction authorization message comprising data associated with the trusted execution environment certificate and a plurality of transaction parameters associated with the transaction; and receive an attestation request message associated with the transaction, the attestation request message comprising a request for determining whether a trusted execution environment that is used for determining whether the transaction satisfies the policy ruleset is secure, and wherein the attestation request message comprises the plurality of transaction parameters associated with the transaction.

Clause 21: The computer program product of any of clauses 17-20, wherein the one or more instructions that cause the at least one processor to receive the policy message cause the at least one processor to: receive the policy message from a smartcard associated with the user involved in the transaction; and wherein the one or more instructions that cause the at least one processor to receive the biometric measurement data associated with the biometric measurement of the user involved in the transaction cause the at least one processor to: receive the biometric measurement data associated with the biometric measurement of the user involved in the transaction from a user device associated with the user.

Clause 22: The computer program product of any of clauses 17-21, wherein the one or more instructions further cause the at least one processor to: receive a transaction authorization status message; and transmit the transaction authorization status message to a smartcard associated with the user involved in the transaction.

Clause 23: The computer program product of any of clauses 17-22, wherein the one or more instructions further cause the at least one processor to: receive a transaction authorization decision message from the smartcard associated with the user based on transmitting the transaction authorization status message to the smartcard.

Clause 24: The computer program product of any of clauses 17-23, wherein the one or more instructions further cause the at least one processor to: determine whether the user is authenticated based on the authentication score These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A-4B are diagrams of an implementation of non-limiting embodiments or aspects of a process for authorizing a transaction.

DESCRIPTION

Figure 1:
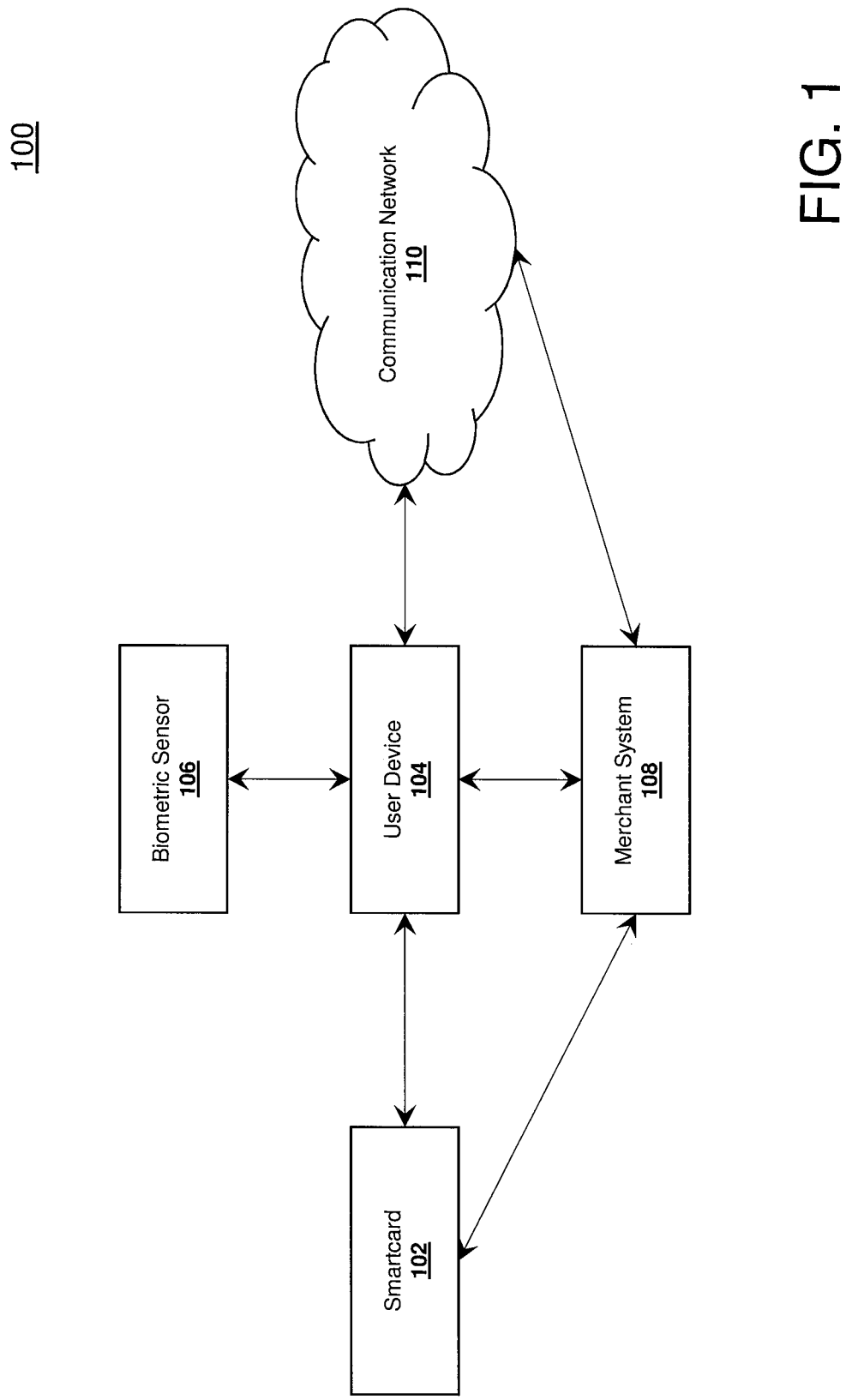
FIG. 1 is a diagram of non-limiting embodiments or aspects of a system for authorizing a transaction.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the terms "issuer," "issuer institution," "issuer bank," or "payment device issuer" may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. The computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. The term "computing system" may include one or more computing devices or computers. The terms "application" or "application program interface" (API) refers to computer code or other data sorted on a computer-readable medium that may be executed by a processor to facilitate the interaction between software components, such as a client-side front-end and/or server-side back-end for receiving data from the client. The term "interface" refers to a generated display, such as one or more graphical user interfaces (GUIs) with which a user may interact, either directly or indirectly (e.g., through a keyboard, mouse, touchscreen, and/or the like). Further, multiple computers, e.g., servers, or other computerized devices directly or indirectly communicating in the network environment may constitute a "system" or a "computing system."

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as POS devices and/or POS systems used by a merchant. In some non-limiting embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, personal data assistants (PDAs), wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network such as, the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to improved systems, methods, and computer program products for authorizing a transaction. In some non-limiting embodiments, a method for authorizing a transaction may include receiving a policy message, the policy message comprising a policy ruleset for determining whether a transaction is authorized and biometric parameters for a machine learning algorithm for authenticating an identity of a user involved in a transaction; receiving biometric measurement data associated with a biometric measurement of a user involved in the transaction; calculating an authentication score based on the biometric measurement data using the machine learning algorithm, wherein the authentication score comprises an indication of whether an identity of the user is authenticated based on the biometric measurement data; determining whether the transaction satisfies the policy ruleset for determining authorization of the transaction; and transmitting a decision message, wherein the decision message comprises an indication of whether the transaction satisfies the policy ruleset.

In this way, non-limiting embodiments or aspects of the present disclosure enable individuals (e.g., merchants) to determine the identity of an individual involved in a transaction. For example, when a user inputs an account identifier (e.g., via an account identifier embodied on a payment device such as a credit card, a debit card, a smartphone, and/or the like) into a merchant system for processing a transaction, the user may be prompted (e.g., by the merchant system) to provide input such as biometric data associated with one or more biometric parameters to verify that the identity of the user is authentic. In this way, transactions initiated by individuals not authorized to initiate transactions with the account identifier may be identified before processing the transaction, and action may be taken (e.g., the transaction may be authorized, the transaction may be not authorized, and/or the like). Additionally, the likelihood that a user's identity will be incorrectly determined to be authentic is reduced as a result of determining the identity of the individual is authentic based on biometric data associated with one or more biometric parameters.

Referring now to FIG. 1, FIG. 1 is a diagram of a non-limiting embodiment of environment 100 in which systems, devices, products, and/or methods described herein may be implemented. As shown in FIG. 1, environment 100 includes smartcard 102, user device 104, biometric sensor 106, merchant system 108, and communication network 110. Smartcard 102, user device 104, biometric sensor 106, and/or merchant system 108 may interconnect (e.g., establish a connection to communicate) via wired connections, wireless connections, or a combination of wired and wireless connections.

Smartcard 102 may include one or more devices capable of being in communication with user device 104 and/or merchant system 108 via a wired connection and/or a short range wireless communication connection (e.g., an NFC communication connection, an RFID communication connection, a Bluetooth® communication connection, and/or the like). For example, smartcard 102 may include one or more computing devices, such as an integrated circuit and/or the like. In some non-limiting embodiments, smartcard 102 may be capable of transmitting and/or receiving data to and/or from user device 104 and/or merchant system 108 via the wired connection and/or the short range wireless communication connection. In some non-limiting embodiments, smartcard 102 may be associated with a user, as described herein. In some non-limiting embodiments, smartcard 102 may include biometric sensor 106.

User device 104 may include one or more devices capable of being in communication with smartcard 102, biometric sensor 106, and/or merchant system 108 via communication network 110 and/or a short range wireless communication connection. For example, user device 104 may include one or more computing devices, such as a mobile device, a smartphone, and/or the like. In some non-limiting embodiments, user device 104 may be associated with a user, as described herein. In some non-limiting embodiments, user device 104 may include smartcard 102 and/or biometric sensor 106.

Biometric sensor 106 may include one or more devices capable of being in communication with user device 104 via a wired connection and/or a short range wireless communication connection. For example, biometric sensor 106 may include a computing device, such as a fingerprint reader, a 2D camera, a 3D camera, and/or the like. In some non-limiting embodiments, biometric sensor 106 may be associated with a user, as described herein. In some non-limiting embodiments, biometric sensor 106 may be a component of user device 104. In some non-limiting embodiments, biometric sensor 106 may be a component of merchant system 108. For example, biometric sensor 106 may be a component of a POS device of merchant system 108. In another example, biometric sensor 106 may be connected to a POS device of merchant system 108.

Merchant system 108 may include one or more devices capable of being in communication with smartcard 102 and/or user device 104 via communication network 110 and/or a short range wireless communication connection. For example, merchant system 108 may include one or more devices, such as a computing device, a computing system, and/or a peripheral device capable of being used by a merchant to conduct a transaction with a user. For example, merchant system 108 may include a POS device and/or a POS system. In some non-limiting embodiments, merchant system 108 may be associated with a merchant, as described herein. In some non-limiting embodiments, merchant system 108 may include user device 104, biometric sensor 106, and/or peripheral devices capable of being used by a user and/or a merchant to conduct a payment transaction with an individual. In some non-limiting embodiments, biometric sensor 106 may be a component of merchant system 108. For example, biometric sensor 106 may be a component of a POS device of merchant system 108. In another example, biometric sensor 106 may be connected to a POS device of merchant system 108.

Communication network 110 may include one or more wired and/or wireless networks. For example, communication network 110 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 2:
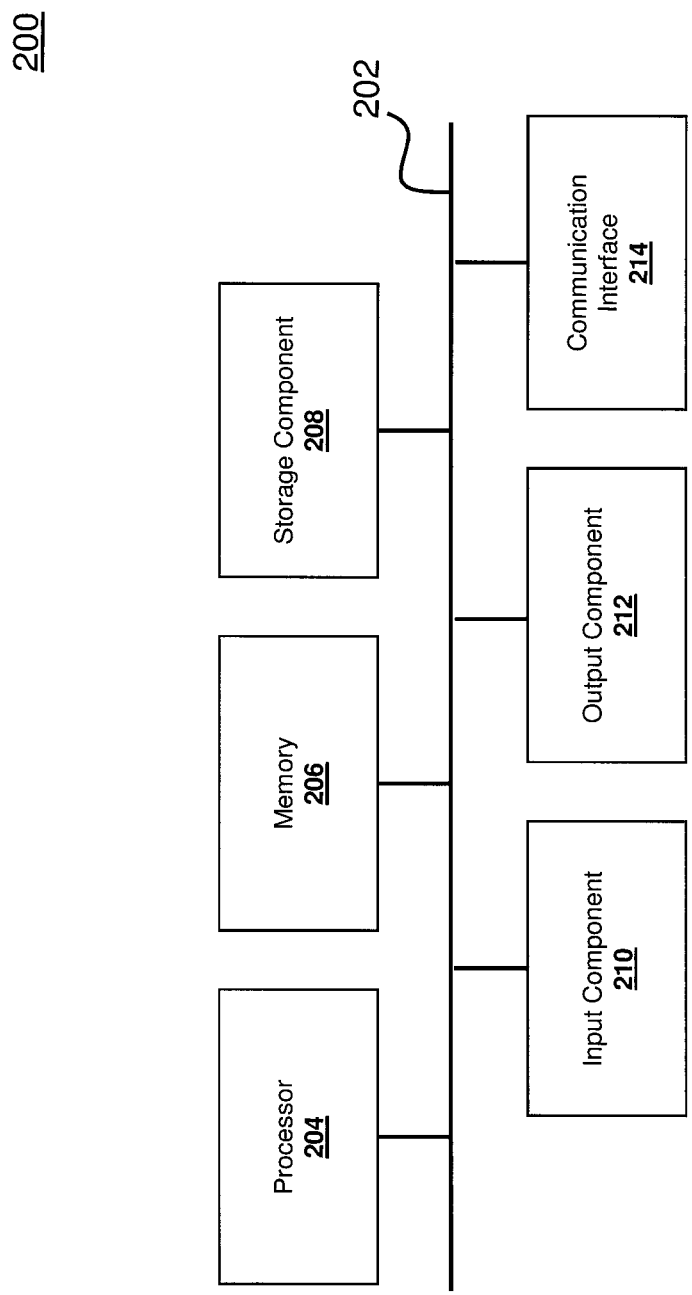
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to smartcard 102 (e.g., one or more devices of smartcard 102), user device 104 (e.g., one or more devices of user device 104), biometric sensor 106 (e.g., one or more devices of biometric sensor 106), and/or merchant system 108 (e.g., one or more devices of merchant system 108). In some non-limiting embodiments, smartcard 102, user device 104, biometric sensor 106, and/or merchant system 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read-only memory (ROM), and/or another type of dynamic or static storage memory (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a biometric sensor, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
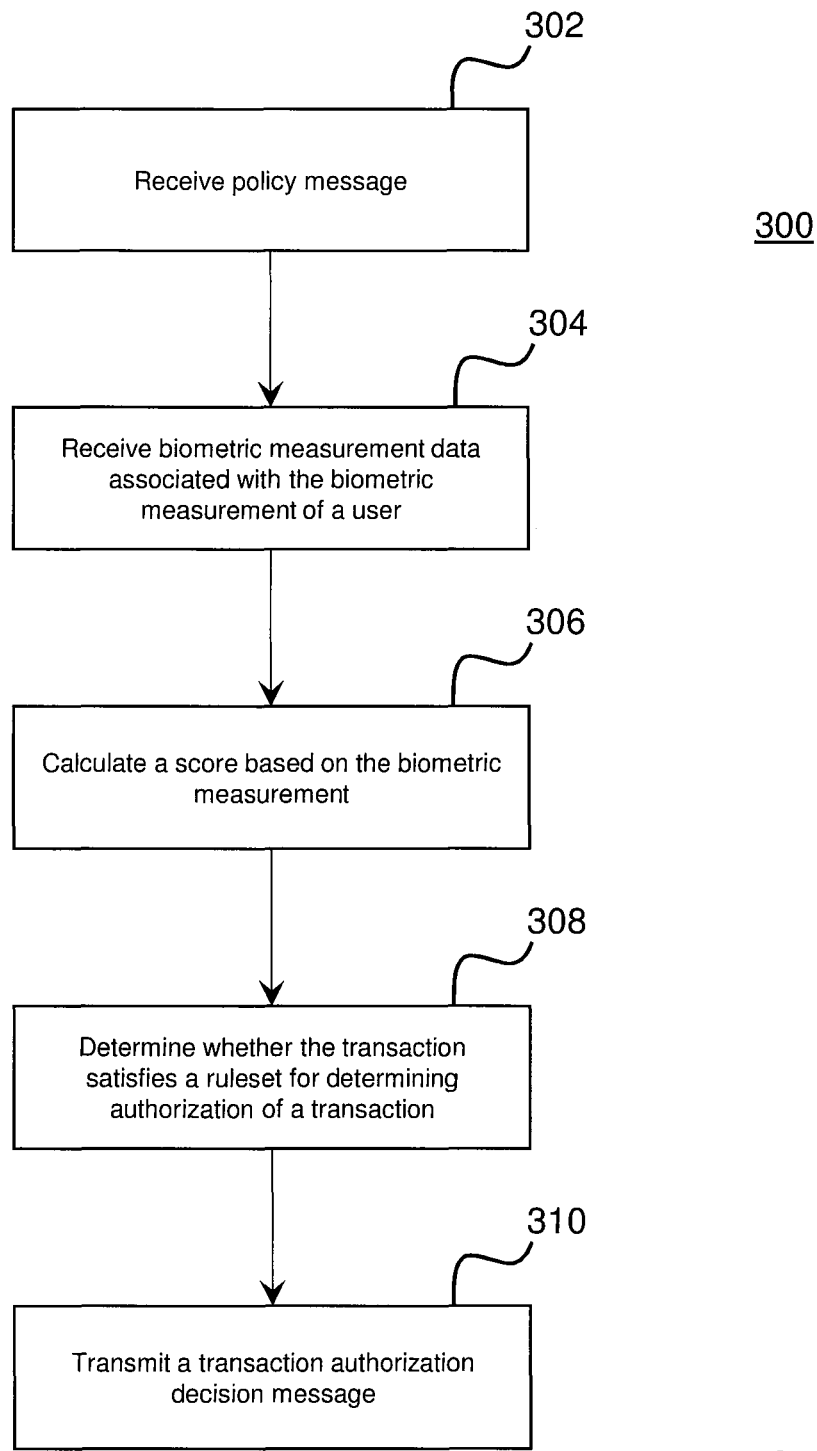
FIG. 3 is a flow diagram of non-limiting embodiments or aspects of a process for authorizing a transaction.

Referring now to FIG. 3, FIG. 3 is a flow diagram of a non-limiting embodiment of a process 300 for authorizing a transaction. In some non-limiting embodiments, one or more steps of process 300 may be performed (e.g., completely, partially, and/or the like) by smartcard 102, user device 104 (e.g., one or more devices of user device 104), biometric sensor 106, and/or merchant system 108 (e.g., one or more devices of merchant system 108).

As shown in FIG. 3, at step 302, process 300 includes receiving a policy message. In some non-limiting embodiments, user device 104 may receive a policy message from smartcard 102. For example, user device 104 may receive the policy message from smartcard 102 via a wired connection and/or a short range wireless communication connection. In some non-limiting embodiments, the policy message may include policy data associated with a transaction policy, updated transaction state data associated with an updated transaction state, transaction data associated with a transaction, and/or wrapped key data associated with a wrapped encryption key. Additionally or alternatively, the policy message may include model data associated with a machine learning model (e.g., a machine learning model that generates an authorization confidence score based on biometric data associated with a biometric measurement of a user, and/or the like).

In some non-limiting embodiments, a transaction policy may include a policy ruleset. The policy ruleset may include a list of one or more rules for determining whether a transaction involving a user is authorized. The one or more rules may include one or more transaction parameters. Additionally or alternatively, the policy ruleset may be ordered such that transaction parameters are analyzed with a rule having a highest priority first to determine whether a transaction is authorized and a rule having a lowest priority is used to determine whether the transaction is authorized last. In some non-limiting embodiments, the one or more rules may include one or more transaction parameters for a transaction. In some non-limiting embodiments, transaction parameters may include an identifier of a transaction value of a transaction (e.g., a value corresponding to a predetermined threshold for a transaction that may be authorized, and/or the like), an identifier of a transaction volume of transactions (e.g., a number of transactions) authorized within a predetermined time period (e.g., one transaction every twenty-four hours, no more than two transactions every forty-eight hours, and/or the like), an identifier of an authentication score (e.g., 0.1 or 10%, 0.25 or 25%, 0.99 or 99%, and/or the like), an identifier of an acceptable merchant (e.g., a government facility, a pharmacy, and/or the like), an identifier of an item (e.g., an over-the-counter pharmaceutical drug, a prescription pharmaceutical drug, a controlled pharmaceutical drug, and/or the like), an identifier of one or more device types involved in the transaction (e.g., a smartcard, a user device, a merchant system, a biometric sensor, and/or the like), a retrieval reference number, and/or the like.

In some non-limiting embodiments, the one or more biometric parameters may include one or more biometric parameters of a user to be processed with a machine learning algorithm to determine an authentication score (e.g., a score including an indication as to the likelihood that the individual operating user device 104 is the intended individual, an indication of whether an identity of the user is authentic based on the biometric measurement data, and/or the like). In some non-limiting embodiments, the one or more biometric parameters may include an identifier of a physical feature of the user (e.g., a depth map corresponding to a face of the user and/or the like), and/or a password of the user (e.g., a PIN of the user, a phrase, and/or the like).

In some non-limiting embodiments, merchant system 108 may generate a transaction authorization request message for a transaction. For example, merchant system 108 may generate the transaction authorization request message for the transaction based on receiving a trusted execution environment certificate (e.g., a certificate provided by a device to confirm that the device is authorized to initiate a transaction, and/or the like). In such an example, merchant system 108 may receive the trusted execution environment certificate from user device 104. In some non-limiting embodiments, merchant system 108 may determine that the execution environment (e.g., the location at which the transaction was initiated) is trusted (e.g., that the transaction is permitted to be initiated at the location and/or the like) based on the trusted execution environment certificate. In some non-limiting embodiments, the transaction authorization request message may include transaction data associated with a transaction and/or certificate fingerprint data associated with a certificate fingerprint (e.g., a unique identifier of a certificate, such as a digest (e.g., a SHA-1 digest and/or the like) of a binary representation of the certificate, and/or the like). In some non-limiting embodiments, the certificate fingerprint data associated with the certificate fingerprint may be used to determine whether a transaction authorization request message is transmitted by the same devices that transmitted an attestation response message. In some non-limiting embodiments, the transaction data associated with the transaction may include one or more transaction parameters for the transaction. In some non-limiting embodiments, the certificate fingerprint may be used to determine whether a device that transmits a message including certificate data associated with a certificate is the device that initiated the transaction. For example, smartcard 102 may determine that a device transmitting a message including certificate data associated with a certificate is the device that initiated the transaction based on a comparison of the certificate data associated with the certificate (and/or data derived from the certificate data associated with the certificate) to the certificate fingerprint data associated with the certificate fingerprint.

In some non-limiting embodiments, smartcard 102 may receive a transaction authorization request message. For example, smartcard 102 may receive the transaction authorization request message from merchant system 108 via a wired connection and/or a short range wireless communication connection. The transaction authorization request message received by smartcard 102 from merchant system 108 may include transaction data associated with a transaction and/or certificate fingerprint data associated with a certificate fingerprint.

In some non-limiting embodiments, smartcard 102 may generate an attestation request message for a transaction. For example, smartcard 102 may generate the attestation request message for the transaction based on receiving a transaction authorization request message for the transaction from merchant system 108. In such an example, smartcard 102 may generate the attestation request message for the transaction based on transaction data associated with the transaction and/or certificate fingerprint data associated with a certificate fingerprint included in the transaction authorization request message. In such examples, the attestation request message may include transaction state data associated with a transaction state (e.g., an indication as to the state of the transaction when progressing through process 300, the indication represented by a counter, a unique value that may be deterministically augmented throughout a transaction, and/or the like) and/or transaction data associated with the transaction.

In some non-limiting embodiments, merchant system 108 may receive an attestation request message for a transaction. For example, merchant system 108 may receive the attestation request message for the transaction from smartcard 102 via a wired connection and/or a short range wireless communication connection. In such an example, the attestation request message may include transaction state data associated with a transaction state and/or transaction data associated with the transaction. In some non-limiting embodiments, smartcard 102 may transmit the attestation request message to merchant system 108 to request data that can be used when determining whether to authorize a transaction for processing. In some non-limiting embodiments, smartcard 102 may transmit the attestation request message before transmitting a policy message to merchant system 108.

In some non-limiting embodiments, merchant system 108 may transmit an attestation request message for a transaction. For example, merchant system 108 may transmit the attestation request message for the transaction to user device 104 based on receiving the attestation request message from smartcard 102. In such an example, the attestation request message transmitted from merchant system 108 to user device 104 may include transaction state data associated with a transaction state and/or transaction data associated with the transaction. In some non-limiting embodiments, merchant system 108 may transmit the attestation request message for the transaction to user device 104 based on determining that user device 104 is associated with a user involved in the transaction.

In some non-limiting embodiments, user device 104 may generate an attestation response message for a transaction. For example, user device 104 may generate the attestation response message for the transaction based on receiving an attestation request message for the transaction from merchant system 108. In some non-limiting embodiments, user device 104 may generate the attestation response message for the transaction based on the transaction state data associated with a transaction state and/or transaction data associated with the transaction that is included in the attestation request message for the transaction. In such an example, the attestation response message generated by user device 104 for the transaction may include transaction state data associated with a transaction state, transaction data associated with the transaction, certificate data associated with a certificate (e.g., a certificate verified by a certificate authority that may include a public key and/or be used to derive a public key), and/or signature data associated with a signature (e.g., data that is encrypted with a private key of user device 104 and/or the like to assert that the user device 104 is in possession of a private key of the user device 104 and is, therefore, authentic). In some non-limiting embodiments, the signature data may include the transaction state data associated with a transaction state, the transaction data associated with the transaction, and/or the certificate data associated with a certificate.

In some non-limiting embodiments, user device 104 may transmit the attestation response message for the transaction to merchant system 108. For example, user device 104 may transmit the attestation response message for the transaction to merchant system 108 based on generating the attestation response message for the transaction. In such an example, the attestation response message sent from user device 104 to merchant system 108 may include transaction state data associated with a transaction state, transaction data associated with the transaction, certificate data associated with a certificate, and/or signature data associated with a signature.

In some non-limiting embodiments, merchant system 108 may receive an attestation response message for a transaction. For example, merchant system 108 may receive the attestation response message for the transaction from user device 104. In such an example, merchant system 108 may receive the attestation response message for the transaction from user device 104 after transmitting an attestation request message for the transaction to user device 104. In some non-limiting embodiments, the attestation response message for the transaction received by merchant system 108 from user device 104 may include transaction state data associated with a transaction state, transaction data associated with the transaction, certificate data associated with a certificate, and/or signature data associated with a signature.

In some non-limiting embodiments, merchant system 108 may transmit an attestation response message for a transaction. For example, merchant system 108 may transmit the attestation response message for the transaction to smartcard 102 via a wired connection and/or a short range wireless communication connection. In some non-limiting embodiments, the attestation response message for the transaction sent by merchant system 108 to smartcard 102 may include transaction state data associated with a transaction state, transaction data associated with the transaction, certificate data associated with a certificate, and/or signature data associated with a signature.

In some non-limiting embodiments, smartcard 102 may generate a policy message for a transaction. For example, smartcard 102 may generate the policy message for the transaction based on the attestation response message for the transaction. In such examples, smartcard 102 may generate the policy message for the transaction based on transaction state data associated with a transaction state, transaction data associated with the transaction, certificate data associated with a certificate, and/or signature data associated with a signature.

In some non-limiting embodiments, a policy message may include policy data associated with a transaction policy, updated transaction state data associated with an updated transaction state (e.g., an augmented counter, a unique value that was deterministically augmented throughout a transaction, and/or the like), transaction data associated with a transaction, and/or wrapped key data associated with a wrapped encryption key. In some non-limiting embodiments, a policy message may also include model data associated with a machine learning model. For example, the policy message may include model data associated with a machine learning model for determining a score for a transaction.

In some non-limiting embodiments, smartcard 102 may request updated policy data associated with a transaction policy. For example, smartcard 102 may request updated policy data associated with a transaction policy based on determining that policy data associated with a transaction policy is expired. In such an example, smartcard 102 may request the updated policy data associated with the transaction policy from merchant system 108 and/or user device 104. For example, smartcard 102 may request the updated policy data associated with the transaction policy from merchant system 108 and/or user device 104 by transmitting an updated policy request message to merchant system 108 and/or user device 104 via a wired connection and/or a short range wireless communication connection. In such an example, merchant system 108 and/or user device 104 may transmit the updated policy request message to a remote computing device (e.g., a transaction service provider system, an issuer system, and/or the like) to cause the remote computing system to transmit an updated policy response message, the updated policy response message including the updated policy data associated with the transaction policy. In some non-limiting embodiments, merchant system 108 and/or user device 104 may transmit the updated policy response message including the updated policy data associated with the transaction policy to smartcard 102 via a wired connection and/or a short range wireless communication connection.

In some non-limiting embodiments, wrapped key data associated with an encryption key may include an encryption key that was encrypted with a second encryption key. For example, smartcard 102 may have stored thereon (e.g., in memory) a wrapped encryption key. The wrapped encryption key may be decrypted by a device that has access to policy data associated with a transaction policy. The encryption key may then be used by the device that has access to the policy data associated with the transaction policy to decrypt the policy data and derive a policy ruleset from the decrypted policy data.

In some non-limiting embodiments, smartcard 102 may encrypt a policy message with a public key derived from certificate data associated with a certificate included in an attestation response message. For example, smartcard 102 may encrypt the policy message with a public key derived from the certificate data associated with the certificate included in an attestation response message received from merchant system 108 before transmitting the policy message. In some non-limiting embodiments, smartcard 102 may encrypt portions of the policy message with the public key derived from certificate data associated with a certificate included in an attestation response message. For example, smartcard 102 may encrypt portions of the policy message with a public key derived from certificate data associated with a certificate included in an attestation response message, such as transaction data associated with the transaction, policy data associated with a transaction policy, model data associated with a machine learning model, and/or the like.

In some non-limiting embodiments, merchant system 108 may receive a policy message for a transaction. For example, merchant system 108 may receive the policy message for the transaction from smartcard 102. In such an example, merchant system 108 may receive the policy message for the transaction from smartcard 102 via a wired connection and/or a short range wireless communication connection. In some non-limiting embodiments, merchant system 108 may receive the policy message for the transaction from smartcard 102 after transmitting an attestation response message to smartcard 102. For example, smartcard 102 may generate the policy message based on receiving the attestation response message from merchant system 108. Smartcard 102 may transmit the policy message to merchant system 108 after generating the policy message. The policy message may include policy data associated with a transaction policy, updated transaction state data associated with an updated transaction state, transaction data associated with a transaction, and/or wrapped key data associated with a wrapped encryption key.

In some non-limiting embodiments, user device 104 may receive a policy message. For example, user device 104 may receive the policy message after transmitting an attestation response message to smartcard 102. In such an example, user device 104 may receive the policy message from smartcard 102 via a wired connection and/or a short range wireless communication connection. In some non-limiting embodiments, the policy message may include policy data associated with a transaction policy, updated transaction state data associated with an updated transaction state, transaction data associated with a transaction, and/or wrapped key data associated with a wrapped encryption key.

As shown in FIG. 3, at step 304, process 300 includes receiving biometric measurement data associated with a biometric measurement of a user. In some non-limiting embodiments, user device 104 may receive biometric measurement data associated with the biometric measurement of a user during a transaction. For example, user device 104 may receive biometric measurement data associated with the biometric measurement of a user in a transaction from biometric sensor 106 via a wired connection and/or a short range wireless communication connection. In some non-limiting embodiments, user device 104 may transmit the biometric measurement data associated with the biometric measurement to merchant system 108. In some non-limiting embodiments, user device 104 may transmit the biometric measurement data associated with the biometric measurement based on receiving a biometric request message from merchant system 108, the biometric request message including a request for biometric measurement data associated with a biometric measurement. Additionally or alternatively, user device 104 may transmit data derived from the biometric measurement data (e.g., a hash of the data associated with the biometric measurement and/or the like) to merchant system 108.

As shown in FIG. 3, at step 306, process 300 includes calculating a score based on the biometric measurement. In some non-limiting embodiments, user device 104 may calculate a score (e.g., an authentication score and/or the like) based on the biometric measurement and/or a policy message. For example, user device 104 may calculate a score based on the biometric measurement using a machine learning algorithm. In such an example, user device 104 may decrypt a wrapped key to derive the key associated with the wrapped key. User device 104 may then decrypt policy data associated with a transaction policy that are encrypted with the key derived from the wrapped key to derive a transaction policy. In some non-limiting embodiments, user device 104 may receive policy data associated with a transaction policy from smartcard 102. For example, smartcard 102 may include the policy data in a policy message when generating the policy message. Additionally or alternatively, user device 104 may receive the policy data from merchant system 108 and/or from a remote computing device (e.g., from a transaction service provider system, an issuer system, and/or the like).

As shown in FIG. 3, at step 308, process 300 includes determining whether the transaction satisfies a ruleset for determining whether a transaction including a user is authorized. For example, user device 104 may determine whether the transaction satisfies a policy ruleset for determining whether a transaction including a user is authorized. In such examples, user device 104 may determine whether the transaction satisfies the policy ruleset for determining whether a transaction including a user is authorized based on comparing one or more transaction parameters for one or more rules of the policy ruleset to one or more transaction parameters of the transaction. Additionally or alternatively, user device 104 may also determine whether an authentication score calculated based on the biometric measurement satisfies one or more rules of the policy ruleset when determining whether the transaction satisfies the policy ruleset. Where user device 104 determines that one or more rules of the one or more policy rulesets are not satisfied, user device 104 may determine that the transaction is not authorized. Where user device 104 determines that one or more rules of the one or more policy rulesets are satisfied, user device 104 may determine that the transaction is authorized.

In some non-limiting embodiments, a policy ruleset for determining authorization of a transaction corresponding to a predetermined threshold for a score may include a rule, the rule including one or more transaction parameters such as, for example, that a value of the transaction be less than a predetermined value, and/or that the quantity of transactions processed in the prior twenty-four hours is less than a first predetermined quantity of transactions.

Additionally or alternatively, a policy ruleset for determining authorization of a transaction corresponding to a predetermined threshold for a score may include a rule, the rule including one or more transaction parameters such as, for example, that the value of the transaction be greater than a first predetermined value but less than a second predetermined value, that the transaction occur in a controlled facility (e.g., that merchant system 108 be located in a controlled facility such as, without limitation, a pharmacy, and/or the like), and/or that the quantity of transactions processed in the prior twenty-four hours (e.g., by merchant system 108 and/or by user device 104) satisfying these conditions be less than or equal to a second predetermined amount of transactions.

Additionally or alternatively, a policy ruleset for determining authorization of a transaction corresponding to a predetermined threshold for a score may include a rule, the rule including one or more transaction parameters such as, for example, that the value of the transaction should be greater than a predetermined value, that the transaction occur in a government-controlled facility (e.g., that merchant system 108 is located in a government-controlled facility), and that the quantity of transactions processed in the prior twenty-four hours (e.g., by merchant system 108 and/or user device 104) satisfying these conditions be less than or equal to a predetermined amount of transactions.

Additionally or alternatively, a policy ruleset for determining authorization of a transaction corresponding to a predetermined threshold for a score may include a rule, the rule including one or more transaction parameters such as, for example, that the transaction involves the sale of medical goods (e.g., controlled substances such as prescriptions), and that the transaction occur in a government-controlled facility.

Additionally or alternatively, a policy ruleset for determining authorization of a transaction corresponding to a predetermined threshold for a score may include a rule, the rule including one or more transaction parameters such as, for example, that the transaction not involve the sale of a controlled substance, that the sale occur in a controlled facility, and that the transaction be the only transaction including the sale of medical goods to a user operating user device 104 for a predetermined time period (e.g., one day and/or the like).

In some non-limiting embodiments, user device 104 may transmit a transaction authorization status message to merchant system 108. For example, user device 104 may transmit the transaction authorization status message to merchant system 108. In some non-limiting embodiments, the transaction authorization status message may include updated transaction state data associated with an updated transaction state, transaction data associated with a transaction, authorization status data associated with an authorization status of the transaction, and/or tag data associated with a tag. In such examples, user device 104 may generate the transaction authorization status message based on determining that the transaction satisfies a transaction policy. In some non-limiting embodiments, user device 104 may transmit the transaction authorization decision message to merchant system 108 based on determining whether the transaction satisfies the policy ruleset. For example, user device 104 may transmit the transaction authorization status message to merchant system 108 based on determining that the transaction satisfies the policy ruleset. In some non-limiting embodiments, user device 104 may forego transmitting the transaction authorization status message to merchant system 108 based on determining that the transaction does not satisfy the policy ruleset.

In some non-limiting embodiments, merchant system 108 may transmit a transaction authorization status message. For example, merchant system 108 may transmit the transaction authorization status message to smartcard 102 via a wired connection and/or a short range wireless communication connection. In such examples, merchant system 108 may transmit the transaction authorization status message to smartcard 102 after receiving the transaction authorization status message from user device 104. In some non-limiting embodiments, merchant system 108 may transmit the transaction authorization status message to smartcard 102 based on determining whether the transaction is authorized. For example, merchant system 108 may transmit the transaction authorization status message to smartcard 102 based on determining that the transaction is authorized. Alternatively, merchant system 108 may forego transmitting the transaction authorization status message to smartcard 102 based on determining that the transaction is not authorized. In some non-limiting embodiments, merchant system 108 may determine that the transaction is or is not authorized based on the transaction authorization status message. For example, merchant system 108 may determine whether the transaction is authorized based on updated transaction state data associated with an updated transaction state, transaction data associated with a transaction, authorization status data associated with an authorization status of the transaction, and/or tag data associated with a tag included in the transaction authorization status message.

As shown in FIG. 3, at step 310, process 300 includes transmitting a transaction authorization decision message. In some non-limiting embodiments, smartcard 102 may transmit a transaction authorization decision message to merchant system 108. For example, smartcard 102 may transmit the transaction authorization decision message to merchant system 108. The transaction authorization decision message may include an indication as to whether the transaction is authorized for processing. In some non-limiting embodiments, smartcard 102 may transmit the decision message based on receiving a transaction authorization status message. For example, smartcard 102 may generate the transaction authorization decision message to merchant system 108 based on updated transaction state data associated with an updated transaction state, transaction data associated with a transaction, authorization status data associated with an authorization status of the transaction, and/or tag data associated with a tag included in the transaction authorization decision message included in the transaction authorization status message. Smartcard 102 may transmit the transaction authorization decision message to merchant system 108 after generating the transaction authorization decision message.

In some non-limiting embodiments, merchant system 108 may process a transaction based on receiving a transaction authorization decision message. For example, merchant system 108 may process the transaction based on receiving the transaction authorization decision message from smartcard 102. In some non-limiting embodiments, merchant system 108 may process the transaction based on determining whether the transaction is authorized. For example, merchant system 108 may process the transaction based on determining that the transaction is authorized. Alternatively, merchant system 108 may forego processing the transaction based on determining that the transaction is not authorized.

Figure 4A:
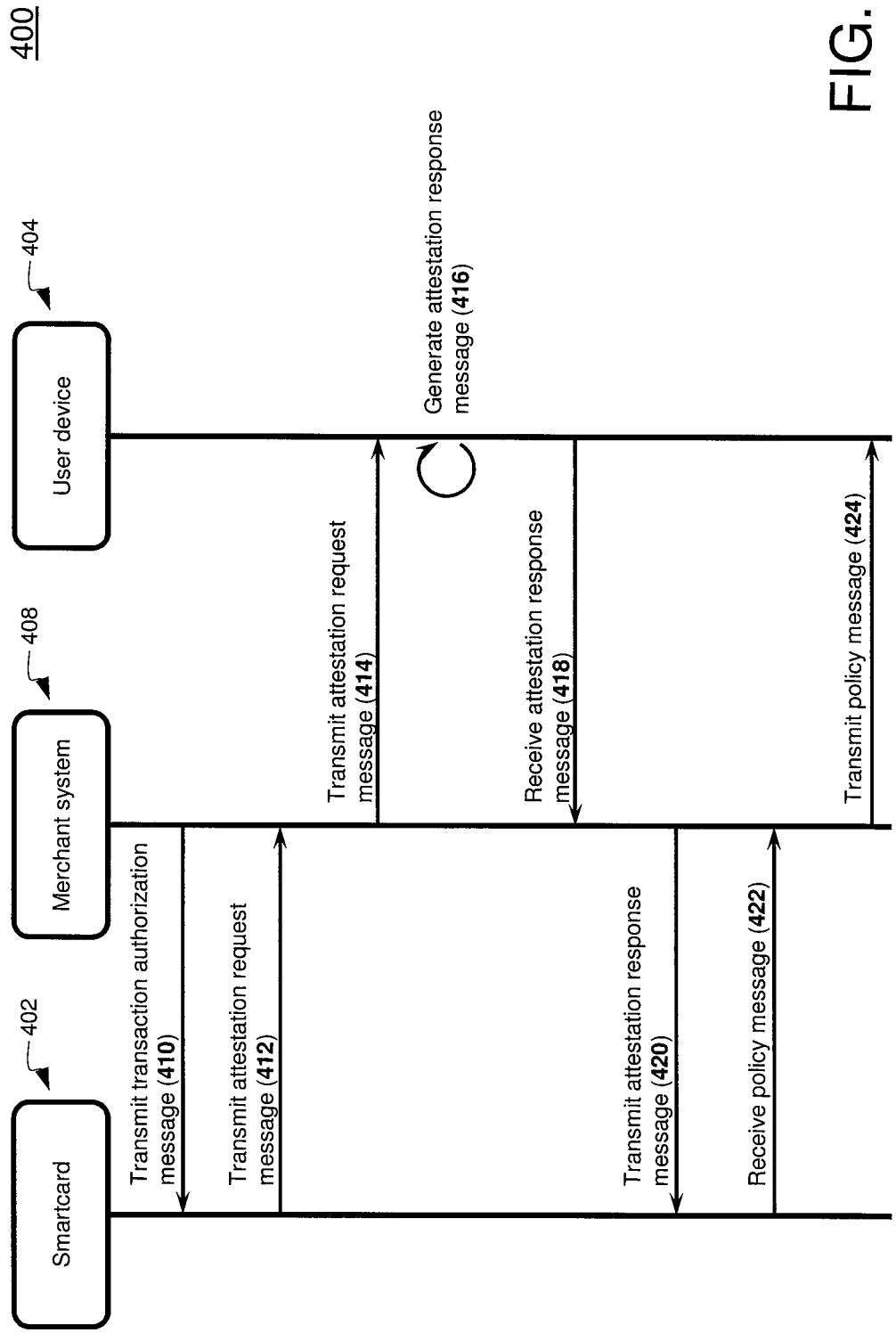

Referring now to FIGS. 4A-4B, FIGS. 4A-4B show an implementation 400 of a non-limiting embodiment or aspect of a process for authorizing a transaction. Specifically, implementation 400 shows an authorization sequence describing steps that may be performed by one or more devices during a transaction. As illustrated in FIGS. 4A-4B, implementation 400 includes smartcard 402, merchant system 408, and user device 404. As shown, one or more of the steps of implementation 400 may be performed (e.g., completely, partially, and/or the like) by smartcard 402, merchant system 408, and user device 404.

As shown by reference number 410 in FIG. 4A, smartcard 402 may receive a transaction authorization request message including transaction data associated with a transaction and a fingerprint data associated with a certificate fingerprint. For example, merchant system 408 may transmit the transaction authorization request message to smartcard 402 after receiving transaction data associated with a transaction at merchant system 408. In such an example, the transaction data associated with the transaction may include transaction parameters associated with the transaction and fingerprint data associated with a certificate fingerprint. Merchant system 408 may receive the fingerprint data associated with a certificate fingerprint and/or may calculate the fingerprint data associated with a certificate fingerprint based on certificate data associated with a certificate received from user device 404. The transaction parameters may be generated by merchant system 408 during a transaction. In some non-limiting embodiments, the transaction parameters may remain static (e.g., may remain unchanged) throughout the course of an authorization sequence (e.g., the performance of one or more steps during authorization of a transaction (see process 300 and/or implementation 400)). For example, the transaction parameters may be included in one or more messages and may not be updated when transmitted between smartcard 402, merchant system 408, and/or user device 404. In some non-limiting embodiments, the fingerprint data associated with a certificate fingerprint may be used as a unique identifier of a certificate issued to user device 404 by a certificate authority (e.g., an entity that issues digital certificates that certify the ownership of a public encryption key). The fingerprint of the certificate may include a digest of the certificate (e.g., a hash of a binary representation of the certificate where the hash is produced using an algorithm, such as Secure Hash Algorithm 1 (SHA-1) and/or the like). In some non-limiting embodiments, user device 404 may transmit the fingerprint of the certificate to merchant system 408.

As shown by reference number 412 in FIG. 4A, smartcard 402 may transmit an attestation request message for the transaction to merchant system 408. For example, smartcard 402 may transmit the attestation request message for the transaction to merchant system 408 after receiving the transaction authorization request message from smartcard 402 to verify that the execution environment (e.g., an application that may be executed on user device 404 during a transaction to determine whether the transaction is authorized or not authorized) is trusted. The attestation request message may include transaction state data associated with a transaction state and/or transaction data associated with the transaction. The transaction state data associated with a transaction state may include a random number represented as a set of bits that, when included in a message communicated between devices during a transaction sequence, may be deterministically updated to guard against replay attacks. The transaction state data associated with a transaction state may be generated by smartcard 402 as a pseudorandom value determined based on one or more of a secret, a counter, and/or other elements. In some non-limiting embodiments, the transaction state data associated with the transaction state may be updated by smartcard 402 based on a change in the secret (e.g., when the secret is altered by a device), the counter (e.g., when the counter is incremented by smartcard 402), and/or the like. In examples where the transaction state data associated with a transaction state is updated during a transaction, messages that were transmitted prior to the update may be analyzed to determine whether transaction state data associated with the transaction state included in one or more messages is invalid (e.g., has already been transmitted and/or have been altered at an unpredicted step in the transaction). For additional security, the attestation request message may be generated by combining a random value and transaction parameters in accordance with a protocol, the protocol defining incorporation of the random value with data communicated between devices in accordance with implementation 400 and/or the signing of messages including the transaction state data associated with the transaction state and/or the transaction parameters with a private encryption key of a device transmitting the data and/or transaction parameters. By virtue of generating the attestation request message in accordance with the protocol, the chance for modification of the transaction parameters without invalidation of the digital signature may be reduced and/or eliminated, thereby rendering the transaction parameters defining the transaction as tamper-proof. Additionally, when the random value and transaction parameters are combined in accordance with the protocol, local storage of the parameters on smartcard 402 may not be necessary to maintain the integrity of the transaction.

As shown by reference number 414 in FIG. 4A, merchant system 408 may transmit the attestation request message to user device 404. For example, merchant system 408 may transmit the attestation request message received from smartcard 402 to user device 404 based on determining that user device 404 is associated with the trusted execution environment. The attestation request message transmitted from merchant system 408 to user device 404 may include transaction state data associated with the transaction state and the transaction parameters included in the attestation request message transmitted from smartcard 402 to merchant system 408.

As shown by reference number 416 in FIG. 4A, user device 404 may generate an attestation response message. For example, user device 404 may generate the attestation response message based on receiving the attestation request message transmitted from smartcard 402 to merchant system 408. The attestation response message may include the transaction state data associated with the transaction state, the transaction data associated with the transaction, certificate data associated with a certificate for user device 404, and/or signature data associated with a digital signature (e.g., a signature of the attestation response message by user device 404 with a private key of user device 404 and/or the like). In some non-limiting embodiments, the certificate of user device 404 may include a public encryption key of user device 404 for encrypting data included in a policy message.

As shown by reference number 418 in FIG. 4A, merchant system 408 may receive the attestation response message. For example, merchant system 408 may transmit the attestation response message from user device 404 after generation of the attestation response message. In such an example, user device 404 may generate the attestation response message after receiving the attestation request message. The attestation response message may include the transaction state data associated with the transaction state, the transaction data associated with the transaction, the certificate data associated with a certificate of user device 404, and/or the signature data associated with the digital signature of the attestation response message.

As shown by reference number 420 in FIG. 4A, merchant system 408 may transmit the attestation response message to smartcard 402. For example, merchant system 408 may transmit the attestation response message to smartcard 402 after receiving the attestation response message from user device 404.

As shown by reference number 422 in FIG. 4A, merchant system 408 may receive a policy message from smartcard 402. For example, merchant system 408 may receive a policy message from smartcard 402 after smartcard 402 generates the policy message. In such an example, smartcard 402 may generate the policy message based on receiving the attestation response message from merchant system 408. In such an example, the policy message may include updated transaction state data associated with an updated transaction state, the transaction data associated with the transaction, and the wrapped key data associated with the wrapped encryption key. In some non-limiting embodiments, the policy message may be encrypted by smartcard 402 with a public key of user device 404 derived from the certificate data associated with the certificate included in the attestation response message. In some non-limiting embodiments, the policy message may include policy data associated with one or more policies.

As shown by reference number 424 in FIG. 4A, merchant system 408 may transmit the policy message to user device 404. For example, merchant system 408 may transmit the policy message to user device 404 after receiving the policy message from smartcard 402. In some non-limiting embodiments, user device 404 may receive policy data associated with a policy. For example, user device 404 may receive policy data associated with a transaction policy from merchant system 408, a computing device associated with a merchant, a computing device associated with a transaction service provider, and/or the like. Additionally or alternatively, in some non-limiting embodiments, user device 404 may receive the policy data associated with the policy from smartcard 402, a flash memory drive, a memory card, a smartphone in communication with user device 404, and/or other like devices. In some non-limiting embodiments, user device 404 may determine that a policy is expired. For example, user device 404 may determine that a policy is expired based on a comparison of an expiration data associated with expiration of the policy included in the policy data associated with the policy and time data associated with a time source (e.g., a time source maintained by user device 404, time data associated with the time and/or data received from a satellite, a network connection, and/or the like). In such an example, where user device 404 determines that a policy is expired, user device 404 may query the device from which the policy data was received for updated policy data associated with the one or more policies.

As shown by reference number 426 in FIG. 4B, user device 404 may receive biometric measurement data associated with a biometric measurement. For example, user device 404 may receive biometric measurement data associated with a biometric measurement of a user operating user device 404 as input (e.g., via a fingerprint scanner, a 2D and/or a 3D camera, and/or the like) received by a biometric sensor. In some non-limiting embodiments, the biometric measurement data may be stored in a secure element of user device 404 (e.g., a microprocessor chip that can store sensitive data and run secure applications thereon).

As shown by reference number 428 in FIG. 4B, user device 404 may calculate an authentication score based on the biometric measurement data received by user device 404. For example, user device 404 may calculate the authentication score based on inputting the biometric measurement data received by user device 404 into a machine learning model. In such an example, user device 404 may receive the authentication score as output from the machine learning model. In some non-limiting embodiments, the authentication score may be calculated in the secure element.

As shown by reference number 430 in FIG. 4B, user device 404 may evaluate the authentication score to determine whether the transaction is authorized or not authorized. For example, user device 404 may receive the policy data associated with the transaction policy and decrypt the policy data with the policy decryption key derived from the wrapped key data associated with the wrapped encryption key included in the policy message. In such an example, user device 404 may determine that a rule of one or more rules included in a ruleset of the transaction policy includes transaction parameters that are satisfied by the transaction. In such an example, user device 404 may determine that the rule of the one or more rules included in the ruleset are satisfied by comparing values associated with the transaction parameters of the transaction to values associated with the transaction parameters of the one or more rules included in the ruleset. In an example, a threshold authentication score may be evaluated by comparing the authentication score output from the machine learning model to the threshold authentication score to determine whether the authentication score output from the machine learning model satisfies the threshold authentication score (e.g., that the authentication score is greater than, equal to, or less than the threshold authentication score). In some non-limiting embodiments, evaluation of the authentication score may occur in the secure element of user device 404.

As shown by reference number 432 in FIG. 4B, user device 404 may transmit a transaction authorization status message to merchant system 408. For example, user device 404 may transmit the transaction authorization status message to merchant system 408 based on determining whether the transaction was authorized or not authorized. In such an example, the transaction authorization status message may include the updated transaction state data associated with the updated transaction state, the transaction data associated with the transaction, authorization status data associated with an authorization status of the transaction, the authorization status indicating whether the transaction was authorized or not authorized, and tag data associated with a tag (e.g., a tag associated with a message authentication code mechanism that ensures data integrity and authenticity, that is, that the device that created the message is in possession of a symmetric key and that the message has not been altered, and/or the like). In some non-limiting embodiments, the tag data associated with the tag may include a standard message authentication code that protects the integrity of the message. In some non-limiting embodiments, user device 404 may transmit the authorization status message to merchant system 408 via the secure element of user device 404.

As shown by reference number 434 in FIG. 4B, merchant system 408 may transmit the transaction authorization status message to smartcard 402. For example, merchant system 408 may transmit the transaction authorization status message to smartcard 402 after receiving the transaction authorization status message from user device 404. Alternatively, merchant system 408 may forego transmitting the transaction authorization status message to smartcard 402 after receiving the transaction authorization status message from user device 404 when authentication status data associated with an authentication status of the transaction includes an indication that the transaction was not authorized.

As shown by reference number 436 in FIG. 4B, smartcard 402 may determine whether the transaction is authorized. For example, smartcard 402 may determine that the transaction is authorized based on receiving the transaction authorization decision message including authentication status data associated with an authentication status of the transaction including an indication that the transaction was authorized. Alternatively, smartcard 402 may determine that the transaction is not authorized based on receiving the transaction authorization decision message including authentication status data associated with an authentication status of the transaction including an indication that the transaction was not authorized.

As shown by reference number 438 in FIG. 4B, smartcard 402 may transmit a transaction authorization decision message to merchant system 408. For example, smartcard 402 may determine that the transaction is authorized and, based on the determination, may generate a transaction authorization decision message including an indication that the transaction may be processed. In some non-limiting embodiments, smartcard 402 may determine that the transaction is not authorized and, based on the determination, may forego generating a transaction authorization decision message including an indication that the transaction may not be processed. Additionally or alternatively, smartcard 402 may determine that the transaction is authorized and, based on the determination, may generate a transaction authorization decision message including an indication that the transaction may be processed.

Although examples have been described in detail for the purpose of illustration based on what is currently considered to be the most practical and preferred embodiments or aspects, it is to be understood that such detail is solely for that purpose and that the principles described by the present disclosure are not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for authorizing a transaction, comprising:

receiving, with at least one processor, from a smartcard associated with a user involved in a transaction, via a point-of-sale (POS) device, an attestation request message associated with the transaction, wherein the attestation request message comprises a request for determining whether a trusted execution environment that is used for determining whether the transaction satisfies a policy ruleset is secure and transaction state data associated with a transaction state, wherein a value of the transaction state data is randomly generated by the smartcard, wherein the smartcard deterministically augments the value of the transaction state data throughout the transaction, and wherein the smartcard generates the attestation request message by combining the value of the transaction state data and transaction parameters associated with the transaction according to a protocol;

in response to receiving the attestation request message, transmitting, with the at least one processor, to the smartcard, via the POS device, an attestation response message generated by a user device associated with the user, wherein the attestation response message comprises an indication of whether the trusted execution environment that is used for determining whether the transaction satisfies the policy ruleset is secure and the transaction state data associated with the transaction state;

receiving, with the at least one processor, from the smartcard, via the POS device, a policy message, the policy message comprising a policy ruleset for determining whether a transaction is authorized, a machine learning model for authenticating an identity of the user involved in the transaction, and updated transaction state data associated with an updated transaction state, wherein the updated transaction state data is generated by the smartcard based on the value of the transaction state data that has been deterministically augmented throughout the transaction by the smartcard;

receiving, with the at least one processor, biometric measurement data associated with a biometric measurement of the user taken by a biometric sensor of one of the POS device and the user device;

executing, with the at least one processor, in the trusted execution environment, the machine learning model to calculate an authentication score based on the biometric measurement data, wherein the authentication score comprises an indication of whether an identity of the user is authenticated based on the biometric measurement data;

determining, with the at least one processor, in the trusted execution environment, based on the authentication score, whether the transaction satisfies the policy ruleset for determining authorization of the transaction;

in response to determining that the transaction satisfies the policy ruleset for determining authorization of the transaction, transmitting, with the at least one processor, to the smartcard, via the POS device, a transaction authorization status message, wherein the transaction authorization status message includes the updated transaction state data; and receiving, with the at least one processor, from the smartcard, via the POS device, a transaction authorization decision message generated by the smartcard based on the transaction authorization status message including the updated transaction state data, wherein the transaction authorization decision message includes an indication of whether the transaction is authorized for processing.

2. The computer-implemented method of claim 1, further comprising:

receiving, with the at least one processor, a trusted execution environment certificate from the user device associated with the user involved in the transaction; and generating, with the at least one processor, a transaction authorization message based on receiving the trusted execution environment certificate from the user device associated with the user, the transaction authorization message comprising data associated with the trusted execution environment certificate and the transaction parameters associated with the transaction.

3. A system for authorizing a transaction, comprising:
at least one processor programmed or configured to:
receive, from a smartcard associated with a user involved in a transaction, via a point-of-sale (POS) device, an attestation request message associated with the transaction, wherein the attestation request message comprises a request for determining whether a trusted execution environment that is used for determining whether the transaction satisfies a policy ruleset is secure and transaction state data associated with a transaction state, wherein a value of the transaction state data is randomly generated by the smartcard, wherein the smartcard deterministically augments the value of the transaction state data throughout the transaction, and wherein the smartcard generates the attestation request message by combining the value of the transaction state data and transaction parameters associated with the transaction according to a protocol;
in response to receiving the attestation request message, transmit, to the smartcard, via the POS device, an attestation response message generated by a user device associated with the user, wherein the attestation response message comprises an indication of whether the trusted execution environment that is used for determining whether the transaction satisfies the policy ruleset is secure and the transaction state data associated with the transaction state;
receive, from the smartcard, via the POS device, a policy message, the policy message comprising a policy ruleset for determining whether a transaction is authorized, a machine learning model for authenticating an identity of the user involved in the transaction, and updated transaction state data associated with an updated transaction state, wherein the updated transaction state data is generated by the smartcard based on the value of the transaction state data that has been deterministically augmented throughout the transaction by the smartcard;
receive biometric measurement data associated with a biometric measurement of the user taken by a biometric sensor of one of the POS device and the user device;
execute, in the trusted execution environment, the machine learning model to calculate an authentication score based on the biometric measurement data, wherein the authentication score comprises an indication of whether an identity of the user is authenticated based on the biometric measurement data;
determine, in the trusted execution environment, based on the authentication score, whether the transaction satisfies the policy ruleset for determining authorization of the transaction;
in response to determining that the transaction satisfies the policy ruleset for determining authorization of the transaction, transmit, to the smartcard, via the POS device, a transaction authorization status message, wherein the transaction authorization status message includes the updated transaction state data; and
receive, from the smartcard, via the POS device, a transaction authorization decision message generated by the smartcard based on the transaction authorization status message including the updated transaction state data, wherein the transaction authorization decision message includes an indication of whether the transaction is authorized for processing.

4. The system of claim 3, wherein the at least one processor is programmed or configured to:
receive a trusted execution environment certificate from the user device associated with the user involved in the transaction; and
generate a transaction authorization message based on receiving the trusted execution environment certificate from the user device associated with the user, the transaction authorization message comprising data associated with the trusted execution environment certificate and the transaction parameters associated with the transaction.

5. A computer program product for authorizing a transaction, the computer program product comprising at least one non-transitory computer-readable medium including one or more program instructions that, when executed by at least one processor, cause the at least one processor to:
receive, from a smartcard associated with a user involved in a transaction, via a point-of-sale (POS) device, an attestation request message associated with the transaction, wherein the attestation request message comprises a request for determining whether a trusted execution environment that is used for determining whether the transaction satisfies a policy ruleset is secure and transaction state data associated with a transaction state, wherein a value of the transaction state data is randomly generated by the smartcard, wherein the smartcard deterministically augments the value of the transaction state data throughout the transaction, and wherein the smartcard generates the attestation request message by combining the value of the transaction state data and transaction parameters associated with the transaction according to a protocol;
in response to receiving the attestation request message, transmit, to the smartcard, via the POS device, an attestation response message generated by a user device associated with the user, wherein the attestation response message comprises an indication of whether the trusted execution environment that is used for determining whether the transaction satisfies the policy ruleset is secure and the transaction state data associated with the transaction state;
receive, from the smartcard, via the POS device, a policy message, the policy message comprising a policy ruleset for determining whether a transaction is authorized, a machine learning model for authenticating an identity of the user involved in the transaction, and updated transaction state data associated with an updated transaction state, wherein the updated transaction state data is generated by the smartcard based on the value of the transaction state data that has been deterministically augmented throughout the transaction by the smartcard;
receive biometric measurement data associated with a biometric measurement of the user taken by a biometric sensor of one of the POS device and the user device;
execute, in the trusted execution environment, the machine learning model to calculate an authentication score based on the biometric measurement data, wherein the authentication score comprises an indication of whether an identity of the user is authenticated based on the biometric measurement data;

determine, in the trusted execution environment, based on the authentication score, whether the transaction satisfies the policy ruleset for determining authorization of the transaction;

in response to determining that the transaction satisfies the policy ruleset for determining authorization of the transaction, transmit, to the smartcard, via the POS device, a transaction authorization status message, wherein the transaction authorization status message includes the updated transaction state data; and receive, from the smartcard, via the POS device, a transaction authorization decision message generated by the smartcard based on the transaction authorization status message including the updated transaction state data, wherein the transaction authorization decision message includes an indication of whether the transaction is authorized for processing.

6. The computer program product of claim 5, wherein the one or more program instructions, when executed by the at least one processor, further cause the at least one processor to:

receive a trusted execution environment certificate from the user device associated with the user involved in the transaction; and generate a transaction authorization message based on receiving the trusted execution environment certificate from the user device associated with the user, the transaction authorization message comprising data associated with the trusted execution environment certificate and the transaction parameters associated with the transaction.

\* \* \* \* \*